(12) United States Patent
Horie

(10) Patent No.: US 11,112,689 B2
(45) Date of Patent: Sep. 7, 2021

(54) LIGHT SOURCE DEVICE AND PROJECTION TYPE DISPLAY APPARATUS

(71) Applicant: NEC Display Solutions, Ltd., Tokyo (JP)

(72) Inventor: Osamu Horie, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 60 days.

(21) Appl. No.: 16/604,944

(22) PCT Filed: May 29, 2017

(86) PCT No.: PCT/JP2017/019920
§ 371 (c)(1),
(2) Date: Oct. 11, 2019

(87) PCT Pub. No.: WO2018/220676
PCT Pub. Date: Dec. 6, 2018

(65) Prior Publication Data
US 2020/0183266 A1 Jun. 11, 2020

(51) Int. Cl.
*G03B 21/20* (2006.01)
*H04N 9/31* (2006.01)
*G03B 33/12* (2006.01)

(52) U.S. Cl.
CPC .......... *G03B 33/12* (2013.01); *G03B 21/204* (2013.01); *G03B 21/2013* (2013.01)

(58) Field of Classification Search
CPC .............. G03B 21/2013; G03B 21/204; G03B 21/2033; H04N 9/3161; H04N 9/3164; H04N 9/3158; G02B 27/141
See application file for complete search history.

(56) References Cited

U.S. PATENT DOCUMENTS

2009/0161076 A1 6/2009 Chen et al.
2012/0327374 A1* 12/2012 Kitano ................. G03B 21/204
353/31

(Continued)

FOREIGN PATENT DOCUMENTS

CN 102326114 A 1/2012
CN 102621791 A 8/2012

(Continued)

OTHER PUBLICATIONS

Japanese Decision to Grant a Patent dated Sep. 15, 2020 for Japanese Patent Application No. 2019-521540 and English Translation thereof.

(Continued)

*Primary Examiner* — Ryan D Howard
(74) *Attorney, Agent, or Firm* — McGinn I.P. Law Group, PLLC.

(57) ABSTRACT

A light source device includes a light source accommodating section provided with a story structure including a first accommodation story and a second accommodation story, a red light source that emits red laser light and a blue light source that emits blue laser light being accommodated in the first accommodation story, and a green light source that emits green fluorescence being accommodated in the second accommodation story; an emission window provided on a side of the second accommodation story; a first light synthesizer that synthesizes an optical path of the red laser light from the red light source and an optical path of the blue laser light from the blue light source into one optical path, and that emits first synthesized light into which the red laser light and the blue laser light are synthesized; and a second light synthesizer that synthesizes an optical path of the green fluorescence.

13 Claims, 14 Drawing Sheets

(56) References Cited

U.S. PATENT DOCUMENTS

2016/0004148 A1* 1/2016 Chiu .................. G03B 33/08
353/84
2017/0315430 A1* 11/2017 Wang .................. G02B 27/141

FOREIGN PATENT DOCUMENTS

| | | |
|---|---|---|
| CN | 103189794 A | 7/2013 |
| CN | 106030403 A | 10/2016 |
| JP | 2011-170271 A | 9/2011 |
| JP | 2013-238739 A | 11/2013 |
| JP | 2016-224304 A | 12/2016 |
| WO | WO 2012/053057 A1 | 4/2012 |

OTHER PUBLICATIONS

International Search Report (ISR) (PCT Form PCT/ISA/210), in PCT/JP2017/019920, dated Jul. 18, 2017.
Chinese Office Action, dated Dec. 17, 2020, in Chinese Application No. 201780091351.X and English Translation thereof.

* cited by examiner

[Figure 1]
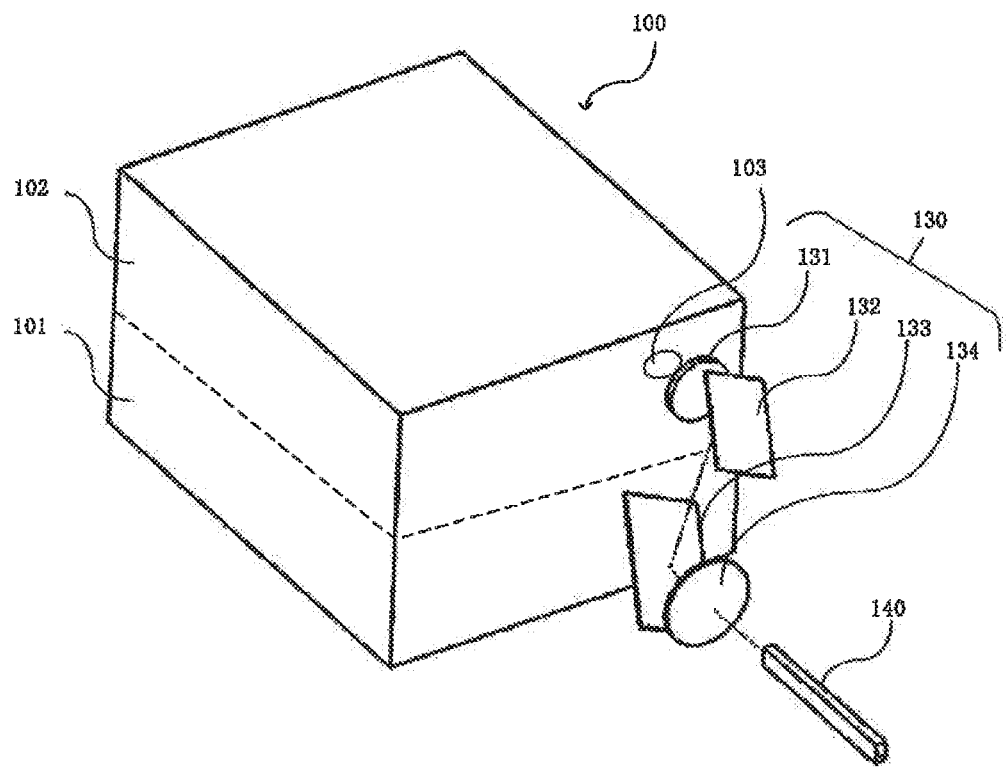
[Figure 2]
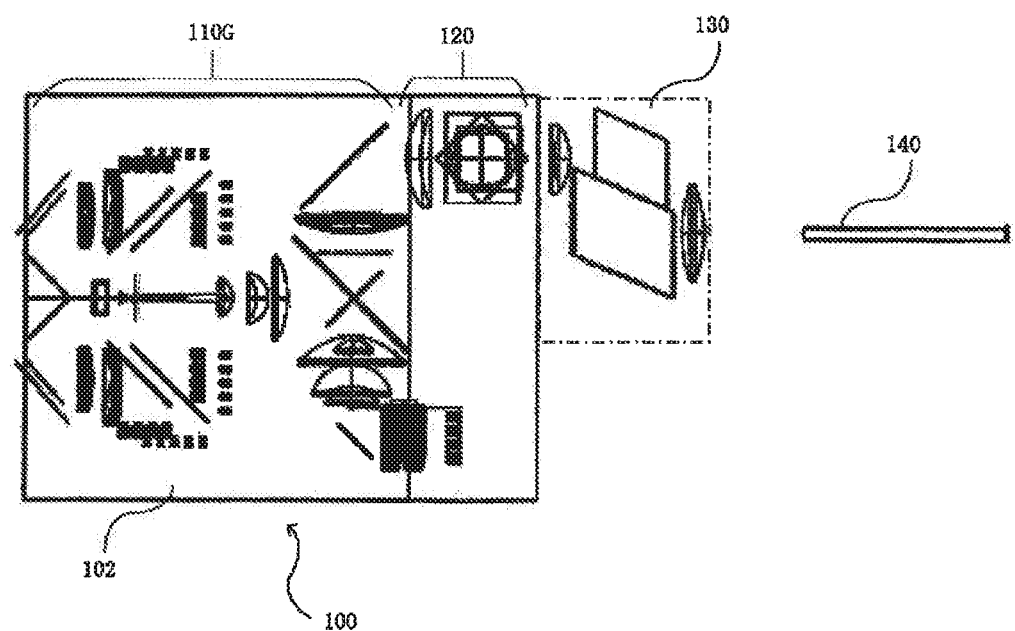

[Figure 3]
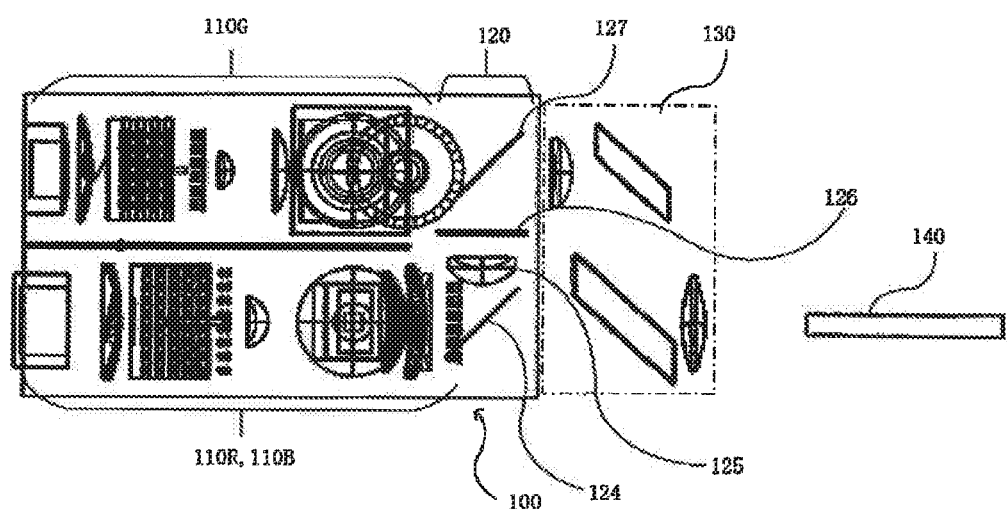

[Figure 4]
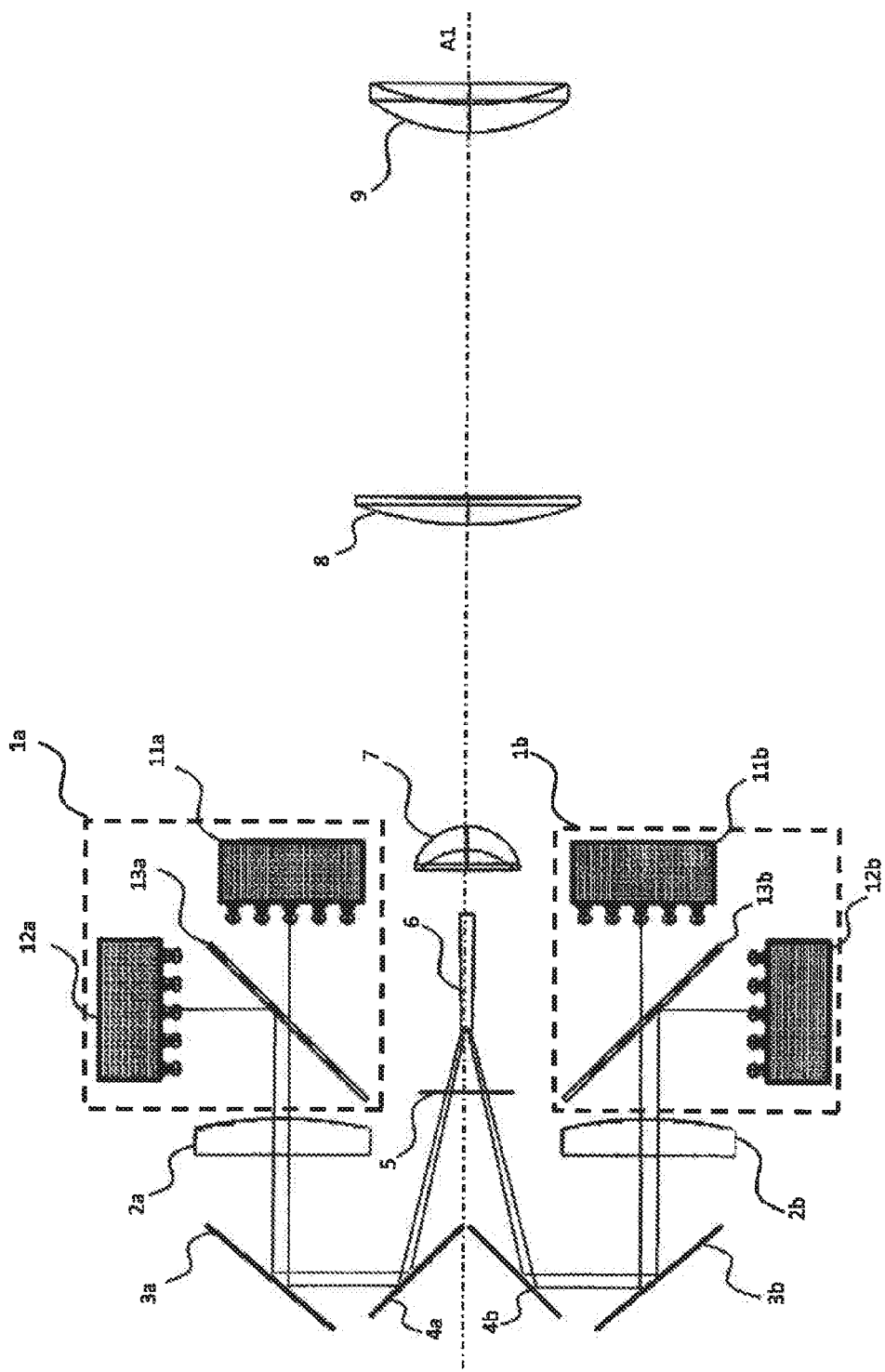

[Figure 5]
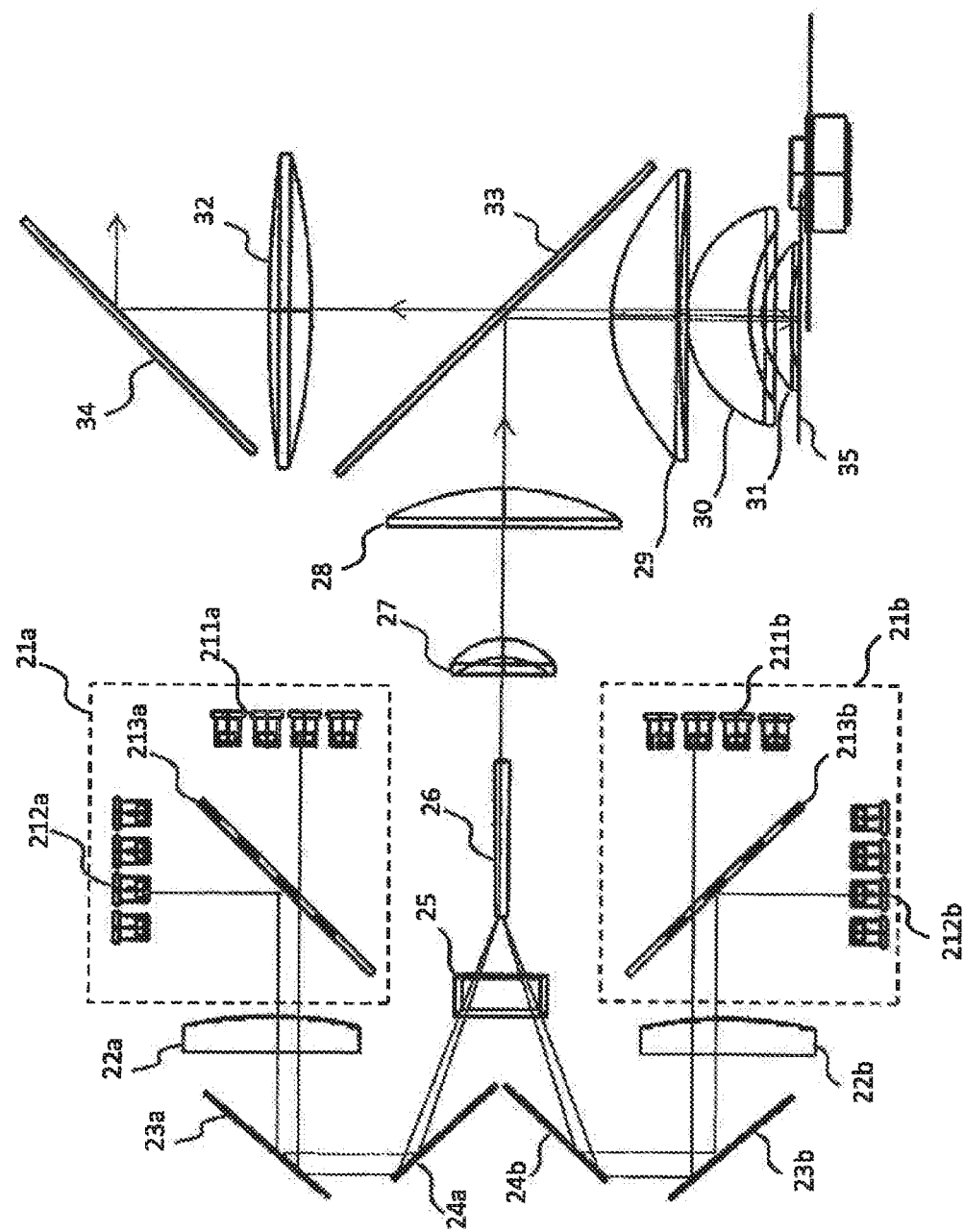

[Figure 6]
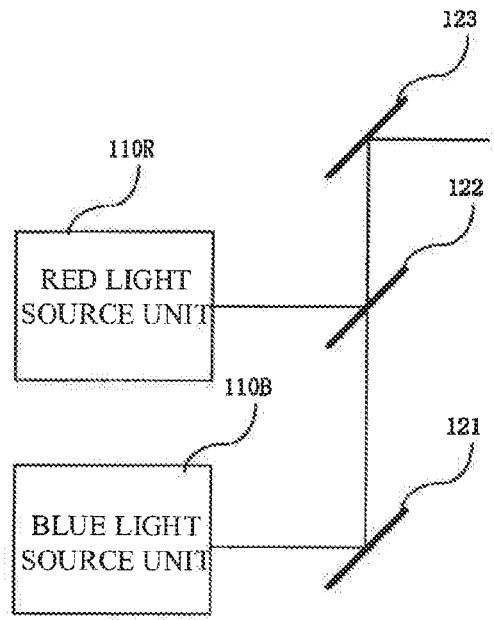
[Figure 7]
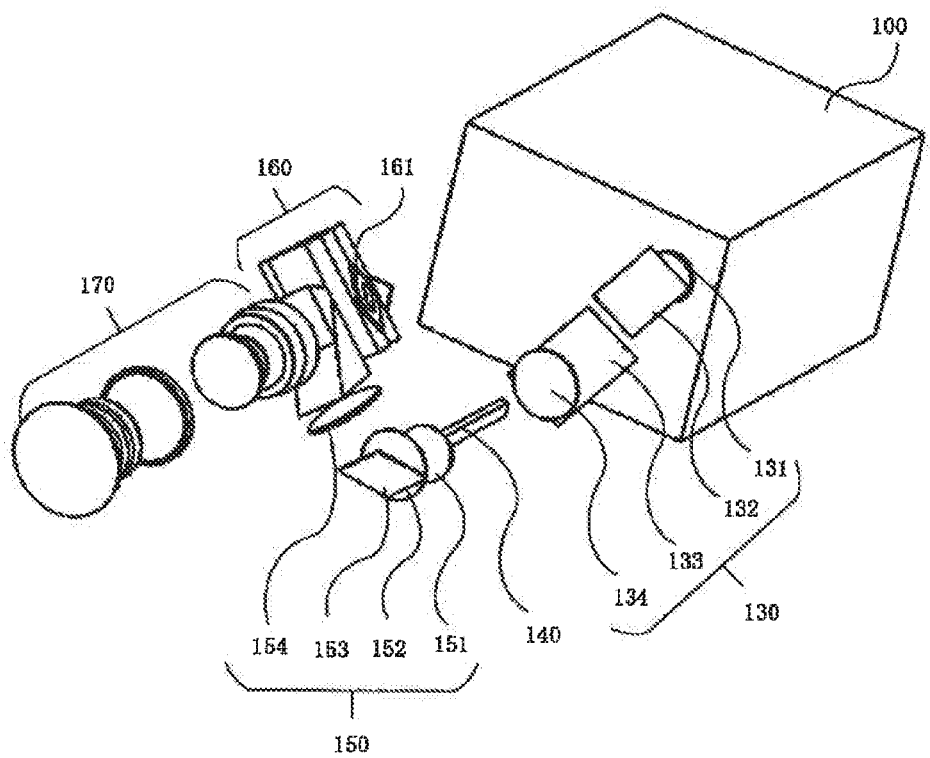

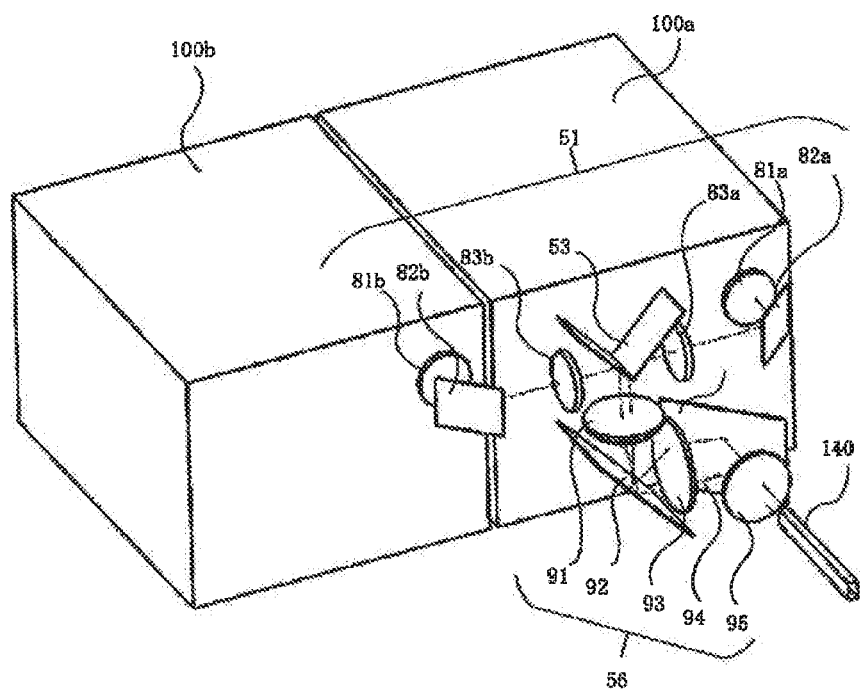
[Figure 8]

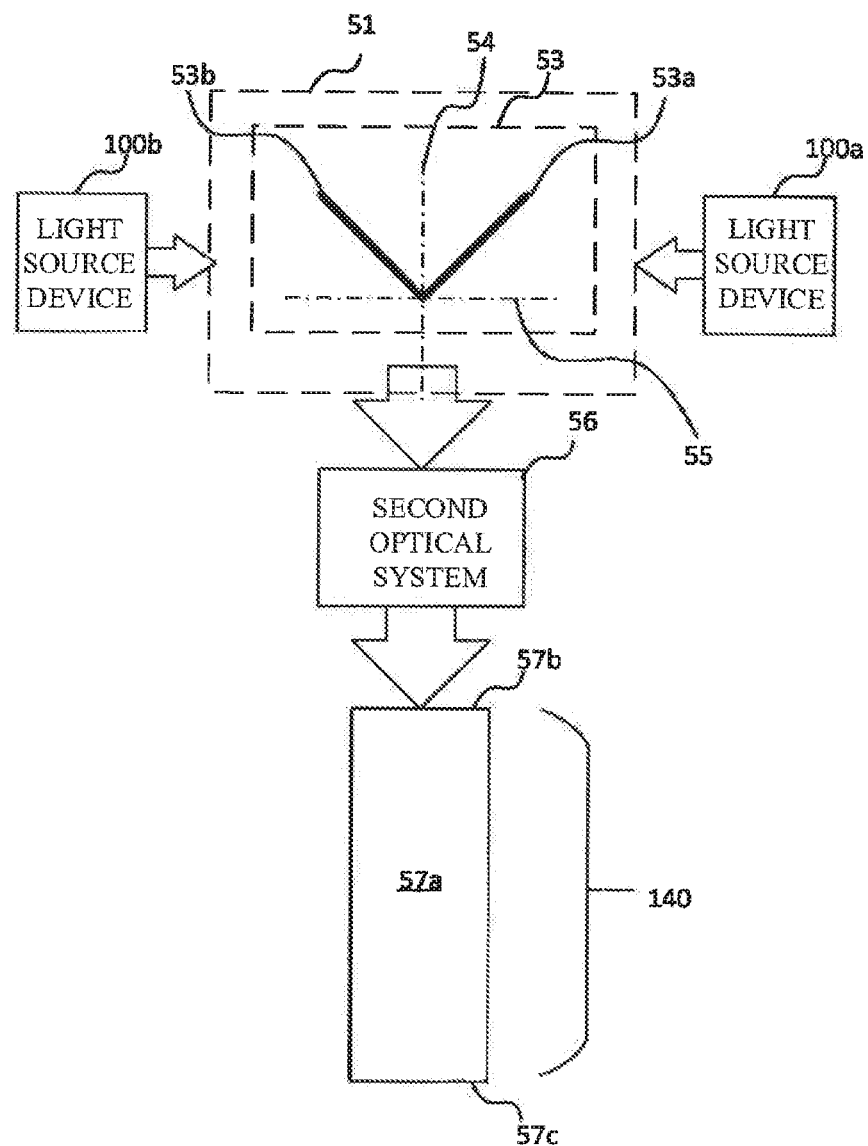
[Figure 9]

[Figure 10]
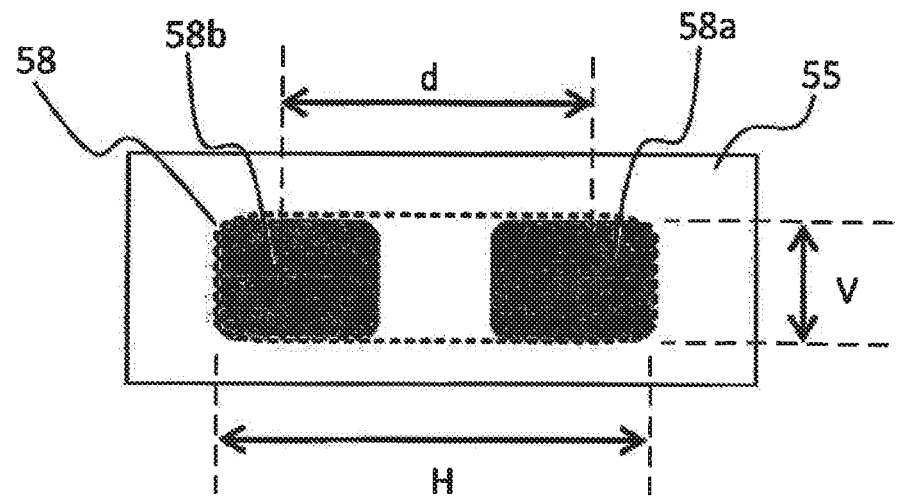
[Figure 11]
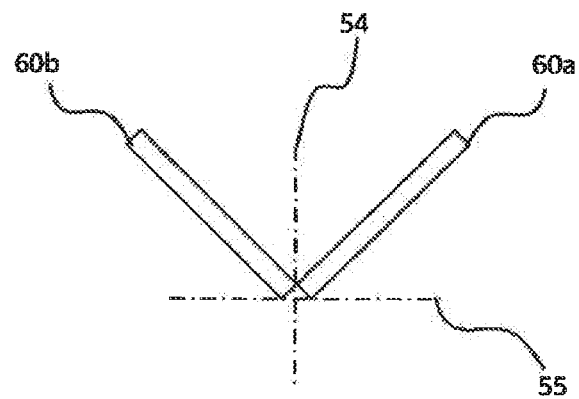

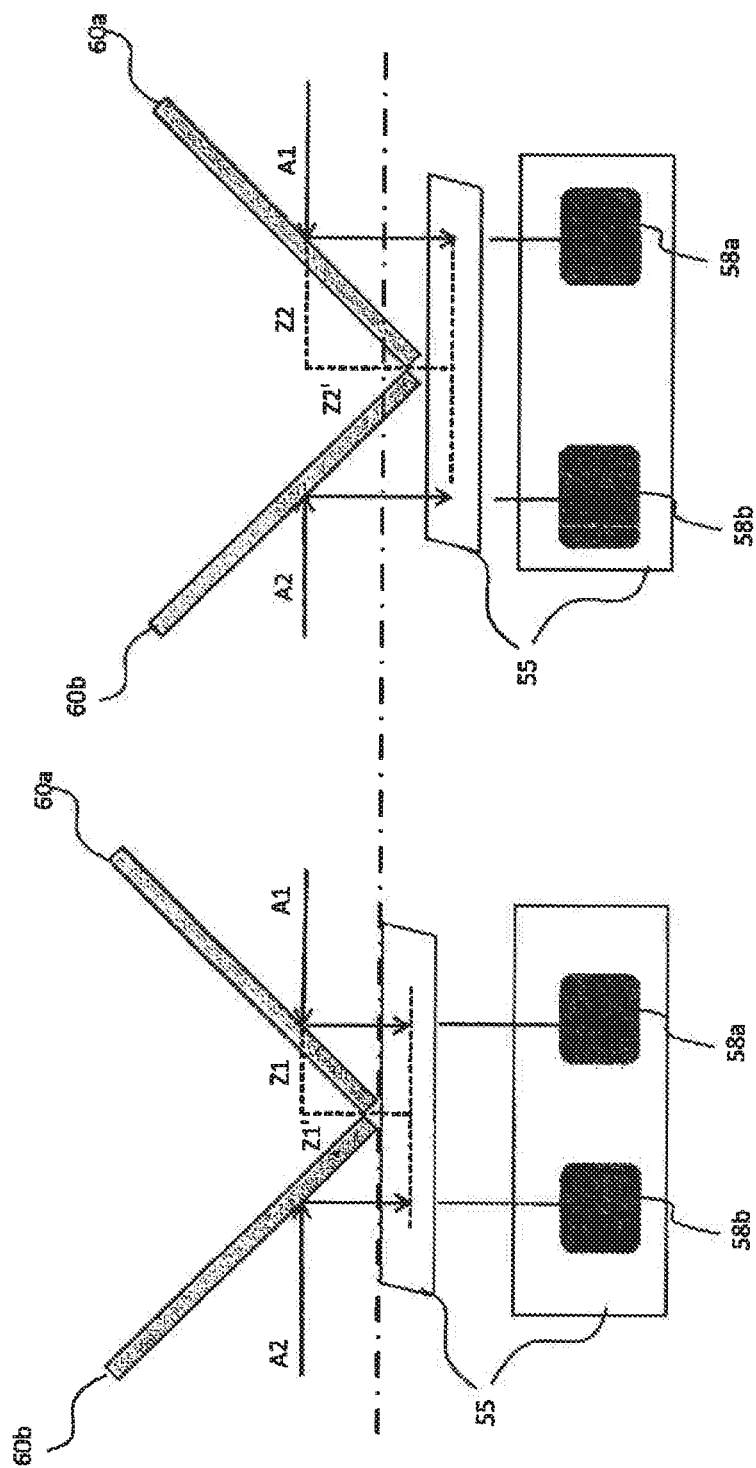
[Figure 12]

[Figure 13]
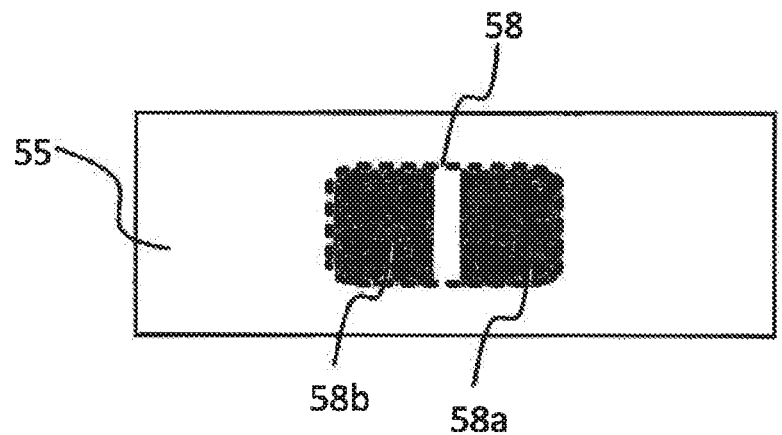
[Figure 14]
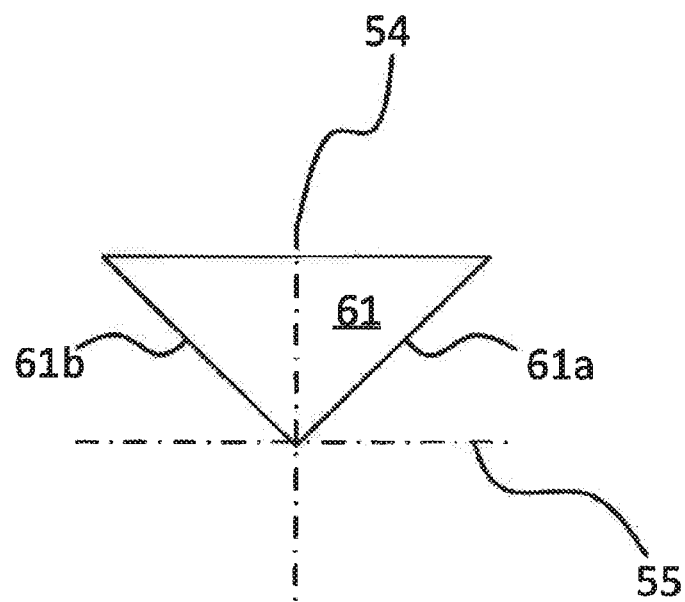

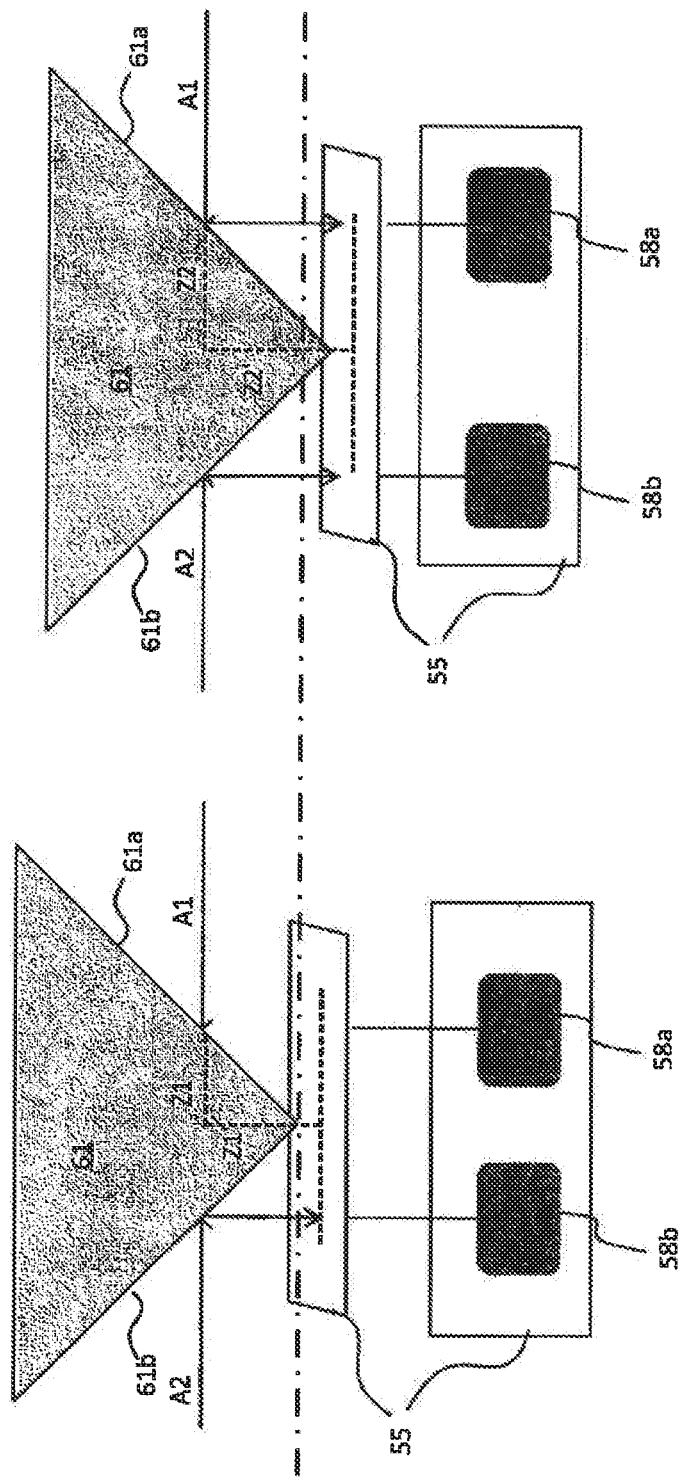
[Figure 15]

[Figure 16A]
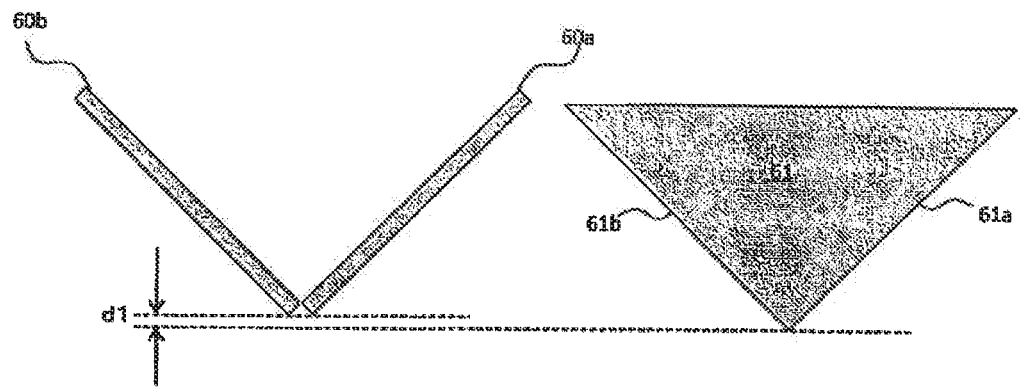
[Figure 16B]
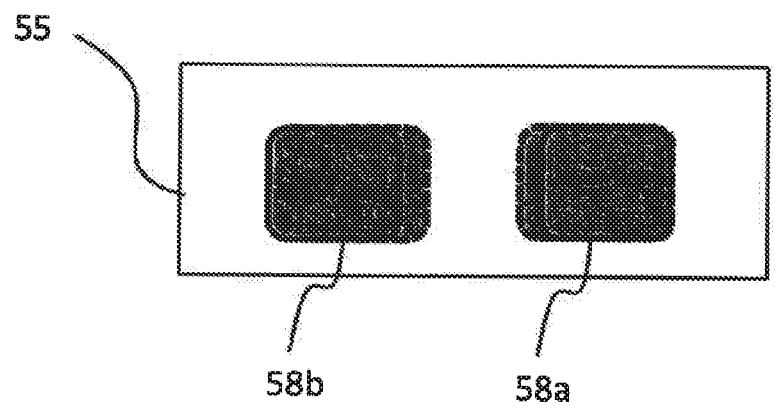

[Figure 17]
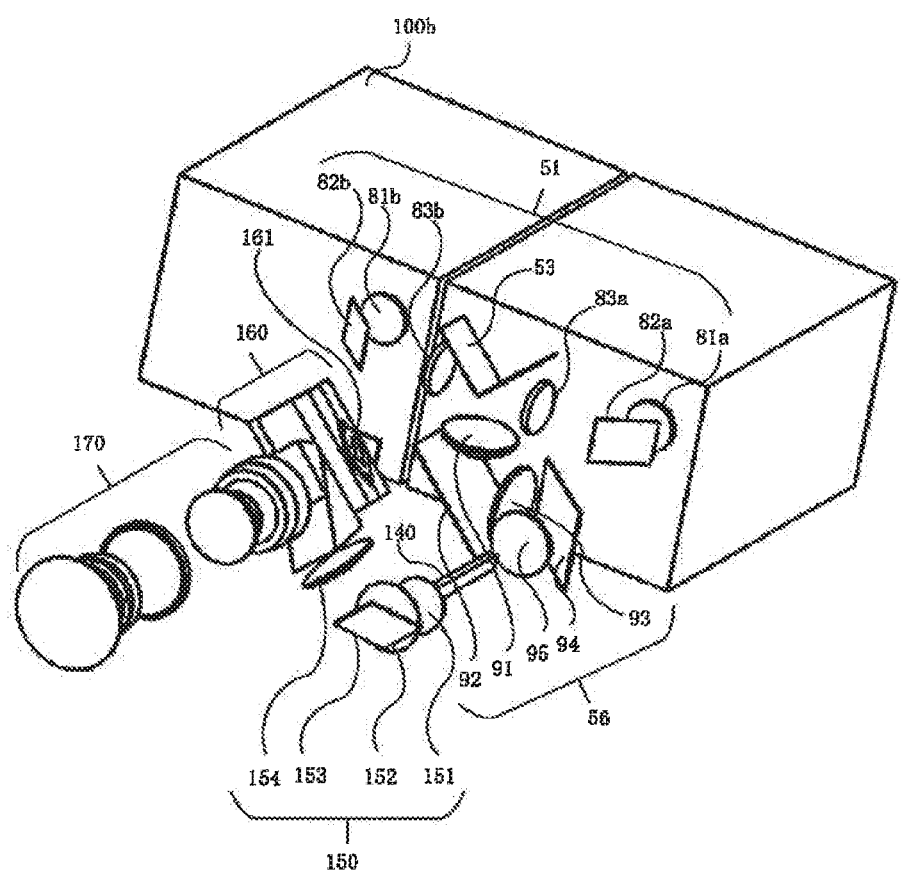

[Figure 18]
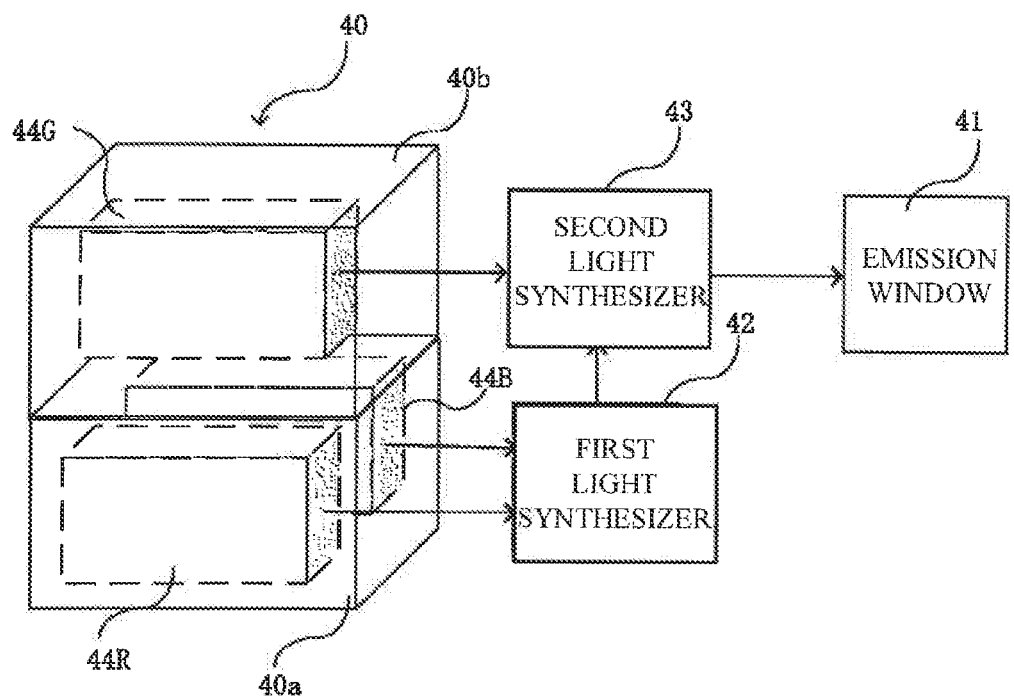

LIGHT SOURCE DEVICE AND PROJECTION TYPE DISPLAY APPARATUS

TECHNICAL FIELD

The present invention relates to a light source device comprising a fluorescent substance and a laser light source, and a projection type display apparatus in which the device is used.

BACKGROUND ART

In recent years, a solid light source such as a laser diode (LD) or a light emitting diode (LED), a light source in which a fluorescent substance is used, or the like has been used as a light source of a projection type display apparatus for reasons of reliability, stability and the like.

In Patent Literature 1, there is described a projection type display apparatus in which a light source comprising an LED is used. This projection type display apparatus has the light source, an illumination optical system, an integrator element, an image display element and a projection optical system.

The light source is provided with a red LED array, a blue LED array and a green LED array. The illumination optical system synthesizes a red optical path from the red LED array, a blue optical path from the blue LED array and a green optical path from the green LED array into one optical path.

Emitted light (red, blue and green) of the illumination optical system enters an entrance surface of the integrator element. The integrator element comprises a glass rod or the like, and the light that enters the entrance surface propagates through the rod to exit from an exit surface. The image display element is irradiated with the emitted light (red, blue and green) of the integrator element as illumination light. The image display element is irradiated with the red light, the blue light and the green light in order.

The image display element comprises a digital micromirror device (DMD) or the like, and the illumination light (red, blue and green) from the integrator element is spatially modulated to form a red image, a blue image and a green image in order. The projection optical system projects, onto a screen or the like, the images (red, blue and green) formed in the image display element.

However, a luminance of the light source device in which the LED is used is lower than that of a light source device in which an LD or a fluorescent substance is used. Consequently, in the projection type display apparatus that is required to have a high luminance, the light source device is utilized in which the LD or the fluorescent substance is used. For example, in a digital cinema projector or the like, a high-output light source device is used into which the fluorescent substance and a laser light source are combined.

In Patent Literature 2, a light source device is described into which a fluorescent substance and a laser light source are combined. This light source device has a yellow fluorescent substance, a red laser light source, a blue laser light source, a first light synthesizer and a second light synthesizer. The yellow fluorescent substance receives excitation light to emit yellow fluorescence. The first light synthesizer emits first synthesized light into which the yellow fluorescence from the yellow fluorescent substance and the red laser light emitted from the red laser light source are synthesized. The second light synthesizer emits second synthesized light into which the first synthesized light emitted from the first light synthesizer and the blue laser light emitted from the blue laser light source are synthesized. This second synthesized light is output light of the light source device.

A light source in which the yellow fluorescent substance is used, the red laser light source and the blue laser light source are arranged on the same plane in a housing. Note that in place of the yellow fluorescent substance, a green fluorescent substance that emits green fluorescence may be also used.

LITERATURE OF THE PRIOR ART

Patent Literature

Patent Literature 1: JP2013-238739A
Patent Literature 2: JP2016-224304A

DISCLOSURE OF THE INVENTION

Technical Problem

A light source device for use in a projection type display apparatus described in Patent Literature 1 has a problem that a luminance of a light source is lower, as compared with a light source device in which an LD or a fluorescent substance is used.

The light source device described in Patent Literature 2 has a luminance that is higher than that of a light source in which an LED is used, but has the following problem.

A light source, in which a yellow fluorescent substance (or a green fluorescent substance) is used, a red laser light source and a blue laser light source are arranged on the same plane (e.g., a bottom surface of a housing). Therefore, a depth and a width of the housing that accommodates these light sources increase, and as a result, an installation area increases.

Furthermore, in general, a divergence angle of fluorescence (yellow fluorescence or green fluorescence) emitted from the fluorescent substance is larger than a divergence angle of laser light emitted from the red laser light source or the blue laser light source. Here, the divergence angle is an angle between an outermost light ray of a light flux and an optical axis. The larger this divergence angle is, the larger a light flux diameter becomes. As a result, a size of an optical component (a lens, a mirror or the like) arranged on an optical path also increases. First and second light synthesizers are arranged on a fluorescence optical path on which this optical component enlarges. Consequently, sizes of the optical components that constitute these light synthesizers increase, and eventually enlargement of the light source device occurs.

An object of the present invention is to provide a high-luminance light source device and a projection type display apparatus in which the above problem is solved and reduction of installation area and miniaturization are possible.

Solution to Problem

To achieve the above object, according to one aspect of the present invention, there is provided a light source device comprising:

a light source accommodating section provided with a story structure comprising a first accommodation story and a second accommodation story, a red light source that emits red laser light and a blue light source that emits blue laser light being accommodated in the first accommodation story, a green light source that emits green fluorescence being accommodated in the second accommodation story, an emission window provided on a side of the second accommodation story, a first light synthesizer that synthesizes an optical path of the red laser light emitted from the red light source and an optical path of the blue laser light emitted from the blue light source into one optical path, and that emits first synthesized light into which the red laser light and the blue laser light are synthesized, and a second light synthesizer that synthesizes an optical path of the green fluorescence emitted from the green light source and an optical path of the first synthesized light emitted from the first light synthesizer into one optical path, and that emits, toward the emission window, second synthesized light into which the green fluorescence and the first synthesized light are synthesized.

According to another aspect of the present invention, there is provided a projection type display apparatus comprising:

the above light source device, an image forming section that modulates output light of the light source device to form an image, and a projection lens that projects the image formed by the image forming section.

According to still another aspect of the present invention, there is provided a projection type display apparatus, comprising:

first and second light source devices, a light synthesizer that synthesizes an optical path of output light of the first light source device and an optical path of output light of the second light source device into one optical path, and that emits illumination light into which the output light of the first light source device and the output light of the second light source device are synthesized, an image forming section that modulates the illumination light to form an image, and a projection lens that projects the image formed by the image forming section, wherein each of the first and second light source devices comprises:

a light source accommodating section provided with a story structure comprising a first accommodation story and a second accommodation story, a red light source that emits red laser light and a blue light source that emits blue laser light being accommodated in the first accommodation story, a green light source that emits green fluorescence being accommodated in the second accommodation story, an emission window provided on a side of the second accommodation story, a first light synthesizer that synthesizes an optical path of the red laser light emitted from the red light source and an optical path of the blue laser light emitted from the blue light source into one optical path, and that emits first synthesized light into which the red laser light and the blue laser light are synthesized, and a second light synthesizer that synthesizes an optical path of the green fluorescence emitted from the green light source and an optical path of the first synthesized light emitted from the first light synthesizer into one optical path, and that emits, toward the emission window, second synthesized light into which the green fluorescence and the first synthesized light are synthesized.

Effect of Invention

According to the present invention, there can be provided a high-luminance light source device in which reduction of installation area and miniaturization are possible.

BRIEF DESCRIPTION OF DRAWINGS

FIG. 1 is a perspective view schematically showing a light source system provided with a light source device according to a first example embodiment of the present invention.

FIG. 2 is a schematic view showing an inner structure when the light source device shown in FIG. 1 is seen from an upper surface.

FIG. 3 is a schematic view showing the inner structure when the light source device shown in FIG. 1 is seen from a side surface.

FIG. 4 is a schematic view showing a configuration of a red light source unit.

FIG. 5 is a schematic view showing a configuration of a green light source unit.

FIG. 6 is a schematic view to explain a configuration of a first light synthesizer.

FIG. 7 is a schematic view showing a configuration of a projection type display apparatus provided with the light source device according to the first example embodiment of the present invention.

FIG. 8 is a perspective view schematically showing a configuration of a light source system according to a second example embodiment of the present invention.

FIG. 9 is a schematic view to explain an operation of the light source system shown in FIG. 8.

FIG. 10 is a schematic view showing a light source image of a light source device formed on a first image forming surface.

FIG. 11 is a schematic view showing a V-shaped mirror that is an example of a reflection element.

FIG. 12 is a schematic view to explain change in the light source image when the V-shaped mirror is moved in a direction vertical to the first image forming surface.

FIG. 13 is a schematic view showing a synthesis surface light source formed on the first image forming surface when the reflection element is disposed so that vignetting occurs in first and second light fluxes.

FIG. 14 is a schematic view showing a right angle prism that is another example of the reflection element.

FIG. 15 is a schematic view showing change in the light source image when the right angle prism is moved in a direction vertical to the first image forming surface.

FIG. 16A is a schematic view explaining a positional relation between the right angle prism and an apex angle portion of the V-shaped mirror.

FIG. 16B is a schematic view for describing a light source image formed on the first image forming surface in a state shown in FIG. 16A.

FIG. 17 is a schematic view showing a configuration of a projection type display apparatus provided with the light source system shown in FIG. 8.

FIG. 18 is a schematic view showing a configuration of a light source device according to a third example embodiment of the present invention.

DESCRIPTION OF EMBODIMENT

Next, description will be made as to an example embodiment of the present invention with reference to the drawings.

First Example Embodiment

FIG. 1 is a perspective view schematically showing a light source system provided with a light source device according to a first example embodiment of the present invention. FIG. 2 is a schematic view showing an inner structure when the light source device shown in FIG. 1 is seen from an upper surface. FIG. 3 is a schematic view showing the inner structure when the light source device shown in FIG. 1 is seen from a side surface. Note that FIG. 1 only shows trajectories of some of light rays for convenience.

As shown in FIGS. 1 to 3, the light source system includes light source device 100, relay optical system 130 and rod integrator 140.

Light source device 100 comprises a housing provided with a story structure of a first story and a second story. Light source unit accommodating section 101 is provided in the first story, and light source unit accommodating section 102 is provided in the second story. In the housing, light guide member 120 is further provided.

Light source unit accommodating section 101 accommodates red light source unit 110R and blue light source unit 110B. Light source unit accommodating section 102 accommodates green light source unit 110G. Emission window 103 is provided on a side of light source unit accommodating section 102 of the housing. Emission window 103 is disposed on an emission optical axis of green light source unit 110G.

Light guide member 120 synthesizes respective optical paths of red laser light emitted from red light source unit 110R, blue laser light emitted from blue light source unit 110B, and green fluorescence emitted from green light source unit 110G into one optical path. Light guide member 120 emits, toward emission window 103, synthesized light into which the red laser light, the blue laser light and the green fluorescence are synthesized. The synthesized light (red, blue and green) that passed through emission window 103 is supplied to an entrance surface of rod integrator 140 via relay optical system 130.

Rod integrator 140 is an optical element (a light uniformizing element) which is provided with a columnar light guide and in which light that enters one surface propagates through the light guide to exit from the other surface. Thus, the light is reflected in the light guide a plurality of times, so that a uniform surface light source can be formed on an exit surface. As rod integrator 140, there can be used a light tunnel including a hollow interior and an inner surface comprising a mirror, a rod formed in a polygonal prismatic column of a transparent material such as glass, or the like.

Hereinafter, description will be made in detail as to the configuration of red light source unit 110R, blue light source unit 110B, green light source unit 110G and light guide member 120.

First, red light source unit 110R will be described.

FIG. 4 shows the configuration of red light source unit 110R. Referring to FIG. 4, red light source unit 110R includes light source parts 1a and 1b, condensing lenses 2a and 2b, reflection mirrors 3a, 3b, 4a and 4b, diffusion plate 5, rod integrator 6 and lenses 7 to 9. Note that FIG. 4 only shows trajectories of some of light rays for convenience.

Light source part 1a includes solid light sources 11a and 12a, and reflection mirror 13a. Solid light sources 11a and 12a have the same structure, and include, for example, a plurality of laser diodes (LDs) that output red laser light. Here, there is used a solid light source in which (n (rows)×m (columns)) red LDs are formed on a holding member provided with a heat radiating portion.

Reflection mirror 13a is a mirror of a stripe structure in which reflection regions and transmission regions are alternately arranged. For example, strip-shaped reflection regions are vapor deposited at predetermined intervals on a transparent substrate, so that the mirror of the stripe structure can be formed.

Each column of the LDs of solid light source 11a corresponds to each transmission region of reflection mirror 13a on a one-to-one basis. Red laser light that exits from the red LDs of each column of solid light source 11a passes through the corresponding transmission region of reflection mirror 13a. Each column of the red LDs of solid light source 12a corresponds to each reflection region of reflection mirror 13a on a one-to-one basis. The red laser light that exits from the red LDs of each column of solid light source 12a is reflected in the same direction as a travel direction of the red laser light transmitted through the transmission region, by the corresponding reflection region of reflection mirror 13a. The red laser light transmitted through the transmission region and the red laser light reflected by the reflection region constitute the output light of light source part 1a. The output light of light source part 1a enters condensing lens 2a.

Light source part 1b includes solid light sources 11b and 12b and reflection mirror 13b. A part that comprises solid light sources 11b and 12b and reflection mirror 13b constitutes the same structure as in the above part that comprises solid light sources 11a and 12a and reflection mirror 13a. The red laser light that exits from solid light source 11b is transmitted through each transmission region of reflection mirror 13b. The red laser light that exits from solid light source 12b is reflected in the same direction as the travel direction of the red laser light that is transmitted through the transmission region, by each reflection region of reflection mirror 13b. The red laser light that is transmitted through the transmission region and the red laser light that is reflected by the reflection region constitute the output light of light source part 1b. The output light of light source part 1b enters condensing lens 2b.

The red laser light that passes through condensing lens 2a successively passes through reflection mirrors 3a and 4a and diffusion plate 5 to enter an entrance surface of rod integrator 6. Similarly, the red laser light that passes through condensing lens 2b successively passes through reflection mirrors 3b and 4b and diffusion plate 5 to enter the entrance surface of rod integrator 6. Condensing lenses 2a and 2b and reflection mirrors 3a, 3b, 4a, and 4b can be called light return means.

The length of a first optical path from light source part 1a to the entrance surface of rod integrator 6 is equal to the length of a second optical path from light source part 1b to the entrance surface of rod integrator 6. A condensing angle (the angle given by 2θ, when an angle formed by an optical axis and an outermost light ray of a light flux is considered as θ) of condensing lens 2a is the same as that of condensing lens 2b. The entrance angle of the central light ray of the light flux that enters the entrance surface of rod integrator 6 in the first optical path is the same as the entrance angle of the central light ray of the light flux that enters the entrance surface of rod integrator 6 in the second optical path.

Rod integrator 6 comprises a columnar light guide in the same manner as in rod integrator 140. As rod integrator 6, there can be used a light tunnel, a rod formed in a polygonal prismatic column of a transparent material such as glass, or the like.

Condensing lens 2a condenses red laser light from light source part 1a and causes the light to enter the entrance surface of rod integrator 6. Condensing lens 2b condenses the red laser light from light source part 1b and the light enters the entrance surface of rod integrator 6. Condensing lenses 2a and 2b on the entrance surface of rod integrator 6 may be configured so that respective condensing positions become identical.

Lenses 7 to 9 constitute a telecentric lens in which the exit pupil is at infinity. The light having passed through this telecentric lens is output light (convergent light) of red light source unit 110R.

In red light source unit 110R shown in FIG. 4, light source parts 1a and 1b are arranged to face each other via rod integrator 6, but the present invention is not limited to this example. Light source parts 1a and 1b may be arranged at any position around rod integrator 6, when light from light source parts 1a and 1b can enter the entrance surface of rod integrator 6 without interference from components such as the mirror that constitutes the light return means.

Furthermore, the number of the light source parts arranged around rod integrator 6 is not limited to two. Three or more light source parts may be arranged around rod integrator 6, when the light from the light source parts can enter the entrance surface of rod integrator 6 without interference from components such as the mirror that constitutes the light return means.

Additionally, the light guide that constitutes rod integrator 6 may have a tapered reflection surface in which a cross-sectional area of a light guide portion increases from the entrance surface toward the exit surface.

Next, the configuration of blue light source unit 110B will be described.

In blue light source unit 110B, as distinct from red light source unit 110R, any optical components such as the rod integrator and the return means are not provided. Blue light source unit 110B includes a plurality of blue solid light sources arranged two dimensionally, and a condensing lens that condenses blue light from these blue solid light sources. The blue solid light source may be a blue LD that outputs the blue laser light. Blue light source unit 110B may include a lens that constitutes the telecentric lens. Furthermore, some of lenses of blue light source unit 110B and some of lenses on a side of red light source unit 110R may constitute the telecentric lens.

Next, the configuration of green light source unit 110G will be described in detail.

FIG. 5 shows a configuration of green light source unit 110G.

Referring to FIG. 5, green light source unit 110G includes light source parts 21a and 21b, condensing lenses 22a and 22b, reflection mirrors 23a, 23b, 24a, 24b, and 34, diffusion plate 25, rod integrator 26, lenses 27 to 32, dichroic mirror 33 and fluorescent wheel 35. Note that FIG. 5 only shows trajectories of some of light rays for convenience.

Light source parts 21a and 21b are the excitation light sources to excite the fluorescent substance, and emit excitation light of the same color.

Light source part 21a includes solid light sources 211a and 212a that emit the excitation light of the same color, and reflection mirror 213a. Solid light sources 211a and 212a have the same structure, and are provided with, for example, a plurality of laser diodes (LDs) that output blue laser light with a central wavelength in a wavelength region of a blue color. Here, the solid light source is used in which (n (rows)×m (columns)) blue LDs are formed on a holding member provided with a heat radiating portion.

Reflection mirror 213a is a mirror of a stripe structure in which reflection regions and transmission regions are alternately arranged. For example, strip-shaped reflection regions are vapor deposited at predetermined intervals on a transparent substrate, so that the mirror of the stripe structure can be formed.

Each column of the blue LDs of solid light source 211a corresponds to each transmission region of reflection mirror 213a on a one-to-one basis. Blue laser light that exits from the blue LDs of each column passes through the corresponding transmission region of reflection mirror 213a. Each column of the blue LDs of solid light source 212a corresponds to each reflection region of reflection mirror 213a on a one-to-one basis. The blue laser light that exits from the blue LDs of each column is reflected in the same direction as the travel direction of the blue laser light that is transmitted through the transmission region, by the corresponding reflection region of reflection mirror 213a. The blue laser light that is transmitted through the transmission region and the blue laser light that is reflected by the reflection region constitute the output light of light source part 21a. The output light of light source part 21a enters condensing lens 22a.

Light source part 21b includes solid light sources 211b and 212b and reflection mirror 213b. A part that comprises solid light sources 211b and 212b and reflection mirror 213b is the same structure as in the above part that comprises solid light sources 211a and 212a and reflection mirror 213a. The blue laser light that exits from solid light source 211b is transmitted through each transmission region of reflection mirror 213b. The blue laser light that exits from solid light source 212b is reflected in the same direction as the travel direction of the blue laser light transmitted through the transmission region, by each reflection region of reflection mirror 213b. The blue laser light that is transmitted through the transmission region and the blue laser light that is reflected by the reflection region constitute the output light of light source part 21b. The output light of light source part 21b enters condensing lens 22b.

The blue laser light that passes through condensing lens 22a successively passes through reflection mirrors 23a and 24a and diffusion plate 25 to enter the entrance surface of rod integrator 26. Similarly, the blue laser light that passes through condensing lens 22b successively passes through reflection mirrors 23b and 24b and diffusion plate 25 to enter the entrance surface of rod integrator 26.

The length of a first optical path from light source part 21a to the entrance surface of rod integrator 26 is equal to the length of a second optical path from light source part 21b to the entrance surface of rod integrator 26. The condensing angle of condensing lens 22a is the same as that of condensing lens 22b. The entrance angle of the central light ray of the light flux that enters the entrance surface of rod integrator 26 in the first optical path is the same as the entrance angle of a central light ray of the light flux that enters the entrance surface of rod integrator 26 in the second optical path.

Rod integrator 26 comprises a columnar light guide in the same manner as in rod integrator 140. As rod integrator 26, a light tunnel, a rod formed in a polygonal prismatic column of a transparent material such as glass, or the like can be used.

Condensing lens 22a condenses the laser light from light source part 21a, so that the light enters the entrance surface of rod integrator 26. Condensing lens 22b condenses the laser light from light source part 21b, so that the light enters the entrance surface of rod integrator 26. Condensing lenses 22a and 22b on the entrance surface of rod integrator 26 may be configured so that respective condensing positions become identical.

In the travel direction of the blue laser light (blue excitation light) that exits from the exit surface of rod integrator 26, lenses 27 and 28 and dichroic mirror 33 are arranged in this order. Lenses 27 and 28 are condensing lenses. Dichroic mirror 33 has reflection and transmission characteristics of reflecting light of the wavelength region of the blue color and transmitting light of another wavelength region, in a wavelength region of visible light. The blue laser light from rod integrator 26 passes through lenses 27 and 28 and is then reflected by dichroic mirror 33.

In the travel direction of the blue laser light (reflection light) from dichroic mirror 33, lenses 29 to 31 and fluorescent wheel 35 are arranged in this order. Lenses 29 to 31 are condensing lenses.

Fluorescent wheel 35 has a rotatable round substrate, and a fluorescent portion formed along a circumferential direction on this round substrate. A central portion of the round substrate is supported by an output shaft of a rotary motor. The rotary motor rotates the round substrate. The fluorescent portion includes a fluorescent substance that can be excited by the blue laser light from dichroic mirror 33. A green fluorescent substance that emits green fluorescence is used as the fluorescent substance.

The blue laser light from dichroic mirror 33 passes through lenses 29 to 31, and then enters the fluorescent portion of fluorescent wheel 35. The green fluorescence (divergent light) that is emitted from the fluorescent portion passes through lenses 29 and 30. The green fluorescence that passed through lenses 29 and 30 is transmitted through dichroic mirror 33. In the travel direction of the green fluorescence (transmission light) from dichroic mirror 33, lens 32 and reflection mirror 34 are arranged in this order. Lens 32 is a condensing lens.

In lenses 27 to 32, lenses 27 to 31 condense the blue laser light that exits from the exit surface of rod integrator 26, onto the fluorescent portion of fluorescent wheel 35. Furthermore, lenses 29 to 32 act so as to condense the green fluorescence (the divergent light) that is emitted from the fluorescent portion. The green fluorescence that passed through lens 32 is reflected by reflection mirror 34. The reflection light (green fluorescence) from reflection mirror 34 is output light (convergent light) of green light source unit 110G. A lens to obtain a parallel light flux or a lens to adjust a light flux diameter may be disposed in the optical path of the green fluorescence that passed through lens 32.

Next, the configuration of light guide member 120 will be described in detail.

Light guide member 120 includes a first light synthesizer that synthesizes the optical path of the red laser light emitted from red light source unit 110R and the optical path of the blue laser light emitted from blue light source unit 110B into one optical path, and a second light synthesizer that synthesizes the optical path of the synthesized light (red and blue) emitted from the first light synthesizer and the optical path of the green fluorescence emitted from green light source unit 110G into one optical path.

First, a configuration of the first light synthesizer of light guide member 120 will be described in detail.

FIG. 6 schematically shows the configuration of the first light synthesizer when seen from an upper surface side. As shown in FIG. 6, the first light synthesizer includes mirrors 121 and 123 and dichroic mirror 122.

An emission optical axis of red light source unit 110R and an emission optical axis of blue light source unit 110B are parallel to each other. Mirror 121 is disposed at an angle of 45° to the emission optical axis of blue light source unit 110B. The blue laser light emitted from blue light source unit 110B enters mirror 121 at an entrance angle of about 45°. Mirror 121 reflects the blue laser light.

The optical path of the blue laser light that is reflected light from mirror 121 is perpendicular to an optical path of the red laser light emitted from red light source unit 110R. Dichroic mirror 122 is disposed in the intersection of these optical paths.

Dichroic mirror 122 has reflection and transmission characteristics of reflecting light of a wavelength region of a red color and transmitting light of another wavelength region, in a wavelength region of visible light. The blue laser light from mirror 121 is transmitted through dichroic mirror 122. The red laser light from red light source unit 110R is reflected by dichroic mirror 122. The blue laser light that transmitted through dichroic mirror 122 and the red laser light reflected by dichroic mirror 122 enter mirror 123 along the same optical path. Mirror 123 reflects red and blue laser light that is synthesized light from dichroic mirror 122 toward the second light synthesizer.

Next, the configuration of the second light synthesizer will be described in detail.

The second light synthesizer includes mirror 124, lens 125, diffusion plate 126 and dichroic mirror 127 shown in FIG. 3.

The synthesized light (red and blue) from mirror 123 of the first light synthesizer enters mirror 124. Mirror 124 is disposed in a first story, and reflects the synthesized light (red and blue) from mirror 123 toward a second story. The reflecting direction of mirror 124 coincides with, for example, the vertical direction.

Diffusion plate 126 and dichroic mirror 127 are arranged in this order in the travel direction of the synthesized light (red and blue) reflected by mirror 124, lens 125. The synthesized light (red and blue) from mirror 124 passes through lens 125 and diffusion plate 126 in order, to enter dichroic mirror 127.

An optical path of the synthesized light (red and blue) that passed through diffusion plate 126 is perpendicular to the optical path of the green fluorescence emitted from green light source unit 110G. Dichroic mirror 127 is disposed in the intersection of these optical paths. Dichroic mirror 127 has reflection and transmission characteristics of transmitting light of a wavelength region of a green color and reflecting light of another wavelength region, in the wavelength region of the visible light.

The green fluorescence from green light source unit 110G is transmitted through dichroic mirror 127. The synthesized light (red and blue) from diffusion plate 126 is reflected by dichroic mirror 127. The synthesized light (red and blue) that is reflected light from dichroic mirror 127 and the green fluorescence that is transmitted light from dichroic mirror 127 enter emission window 103 shown in FIG. 1 along the same optical path. That is, the synthesized light into which the red laser light, the blue laser light and the green fluorescence are synthesized is emitted from emission window 103.

In the above second light synthesizer, diffusion plate 126 is common to red light source unit 110R and blue light source unit 110B. Diffusion plate 126 may be vibrated in order to prevent speckles.

Furthermore, lens 125 is an adjusting lens to adjust so that a light flux diameter of the synthesized light (red and blue) that enters dichroic mirror 127 is aligned with a light flux diameter of the green fluorescence that enters dichroic mirror 127. In dichroic mirror 127, both the synthesized light (red and blue) and the green fluorescence are convergent light, and hence, the size of dichroic mirror 127 can be decreased.

Again refer to FIG. 1. The emitted light (red, blue and green) of emission window 103 enters an entrance surface of rod integrator 140 via relay optical system 130. Relay optical system 130 comprises mirrors 132 and 133 and lenses 131 and 134. Lenses 131 and 134 are relay lenses.

The emitted light (red, blue and green) of emission window 103 enters mirror 132 via lens 131. Mirror 132 is disposed at an angle of 45° to an optical axis of lens 131. The emitted light (red, blue and green) of lens 131 enters mirror 132 at an entrance angle of about 45°. Mirror 132 reflects the emitted light of lens 131 in the direction (e.g., the vertical direction) from the second story toward the first story.

The reflected light (red, blue and green) from mirror 132 enters mirror 133. Mirror 133, lens 134 and rod integrator 140 are arranged at a height corresponding to the first story. Mirror 133 reflects the reflected light (red, blue and green) from mirror 132 toward rod integrator 140.

The reflected light (red, blue and green) from mirror 133 enters the entrance surface of rod integrator 140 via lens 134.

According to light source device 100 described above, the following effects are produced.

Red light source unit 110R and blue light source unit 110B are accommodated in light source unit accommodating section 101 of the first story, and green light source unit 110G is accommodated in light source unit accommodating section 102 of the second story. According to such a story structure (a two-floor structure) in which the light source units are accommodated in the first story and the second story in a divided manner, the depth and the width of the housing can be decreased and the installation area can be decreased, as compared with a one-floor structure in which all the light source units are arranged on the same plane.

Furthermore, in light guide member 120, the first synthesizer synthesizes the red laser light and the blue laser light, and the second synthesizer synthesizes the synthesized light (red and blue laser light) from the first synthesizer and the green fluorescence. In this case, each of mirrors 121 and 123 and dichroic mirror 122 that constitute the first synthesizer is disposed on an optical path of laser light having a divergence angle that is smaller than that of the green fluorescence. Therefore, the sizes of mirrors 121 and 123 and dichroic mirror 122 can be decreased.

Similarly, among mirror 124, lens 125, diffusion plate 126 and dichroic mirror 127 that constitute the second light synthesizer, mirror 124, lens 125 and diffusion plate 126 are also arranged on the optical path of the laser light. Consequently, the sizes of mirror 124, lens 125 and diffusion plate 126 can be decreased.

Furthermore, both the synthesized light (red and blue) and the green fluorescence that enter dichroic mirror 127 are convergent light. Therefore, the size of dichroic mirror 127 can be decreased.

Note that emission window 103 may be provided in the first story such that the synthesized light into which the red laser light and the blue laser light are synthesized and the green fluorescence can be synthesized in the first story. However, in this case, a light guide member such as a mirror to guide the green fluorescence from the second story to the first story is required, and hence, the following problem occurs.

In general, it is thought that human eyes feel green light the strongest and that the brightness of the light source is most influenced by the green light. In the light guide member such as the lens or the mirror, a light loss of several percentages is generated, and hence, it is not preferable that the light guide member be provided in the green optical path that most influences the brightness.

Furthermore, the divergence angle of the green fluorescence is larger than that of the laser light. Therefore, when the light guide member is provided in the fluorescence optical path, the size of the light guide member needs to be increased. Increasing the size of the light guide member causes enlargement of the light source device.

Next, a configuration of a projection type display apparatus provided with light source device 100 will be described.

FIG. 7 is a schematic view showing the configuration of the projection type display apparatus provided with light source device 100.

Referring to FIG. 7, the projection type display apparatus includes light source device 100, relay optical system 130, rod integrator 140, illumination optical system 150, prism section 160, digital micromirror device (DMD) 161 and projection lens 170. Light source device 100, relay optical system 130 and rod integrator 140 have been already described, and here, specific description of these configurations is omitted.

The light (red, blue and green) emitted from an exit surface of rod integrator 140 enters prism section 160 via illumination optical system 150. Illumination optical system 150 comprises lenses 151, 152 and 154 and mirror 153. Prism section 160 includes a total internal reflection (TIR) prism, and a color separation synthesis prism provided with a dichroic film. Prism section 160 has an entrance surface, an exit surface and first to third side surfaces. First to third DMDs 161 are arranged on the first to third side surfaces, respectively.

Illumination light from illumination optical system 150 enters the entrance surface of prism section 160. In prism section 160, the light that enters the entrance surface is separated into red light, blue light and green light. First DMD 161 is irradiated with the red light from the first side surface. Second DMD 161 is irradiated with the blue light from the second side surface. Third DMD 161 is irradiated with the green light from the third side surface. Lenses 151, 152 and 154 form light source images formed on the exit surface of rod integrator 140, onto respective image forming surfaces of first to third DMDs 161.

First DMD 161 modulates the red light to form a red image. Second DMD 161 modulates the blue light to form a blue image. Third DMD 161 modulates the green light to form a green image. Red image light enters the first side surface from first DMD 161. Blue image light enters the second side surface from second DMD 161. Green image light enters the third side surface from third DMD 161. The red image light, the blue image light and the green image light that enter the first to third side surfaces are emitted from the exit surface toward the projection lens 170, respectively.

Projection lens 170 enlarges and projects the red image light, the blue image light and the green image light on the unshown projection surface.

According to the above described projection type display apparatus, light source device 100 is configured in the two-floor structure, and hence, the following effects are produced.

When respective heights of light source device 100, relay optical system 130, rod integrator 140, illumination optical system 150, prism section 160, DMD 161 and projection lens 170 are compared, prism section 160 is highest. Here, the height is a height from a bottom surface of the housing of the projection type display apparatus. The height of the housing of the projection type display apparatus is set to the height of prism section 160. Consequently, in a space where another member such as light source device 100 is disposed, a dead space is present in an upper portion. In light source device 100, the two-floor structure is realized by utilizing the dead space of the upper portion without incurring enlargement of the housing in a height direction. Thus, light source device 100 is configured in the two-floor structure, so that reduction in an installation area of the projection type display apparatus itself and miniaturization thereof are possible.

Furthermore, emission window 103 is provided in the second story of light source device 100, and rod integrator 140 is disposed at a height of the first story. According to this structure, a large interval can be obtained between an optical axis of emission window 103 and an optical axis of rod integrator 140, and hence, the degree of freedom in arranging respective elements of relay optical system 130 increases. Note that when the interval between the optical axis of emission window 103 and the optical axis of rod integrator 140 is small, optical members of mirrors 132 and 133 and lenses 131 and 134 may interfere with one another, or vignetting may occur in some of the optical members.

Second Example Embodiment

FIG. 8 is a perspective view schematically showing a light source system according to a second example embodiment of the present invention.

Referring to FIG. 8, the light source system includes two light source devices 100a and 100b, first optical system 51, second optical system 56 and rod integrator 140. Each of light source devices 100a and 100b is the same as light source device 100 described in the first example embodiment. Rod integrator 140 is the same as described in the first example embodiment.

Emitted light (red, blue and green) of light source device 100a and emitted light (red, blue and green) of light source device 100b enter an entrance surface of rod integrator 140 via first optical system 51 and second optical system 56. First optical system 51 includes lenses 81a, 81b, 83a and 83b, mirrors 82a and 82b and reflection element 53. Second optical system 56 includes lenses 91, 93 and 95 and mirrors 92 and 94.

The emitted light of light source device 100a enters mirror 82a via lens 81a. Mirror 82a is disposed at an angle of 45° to an optical axis of lens 81a. The emitted light (red, blue and green) of lens 81a enters mirror 82a at an entrance angle of about 45°. Mirror 82a reflects the emitted light of lens 81a toward lens 83a. The reflected light from mirror 82a enters reflection element 53 via lens 83a. Here, lenses 81a and 83a and the lenses in light source device 100a may constitute a first double telecentric optical system. The double telecentric optical system means a telecentric optical system in which an optical axis and a principal ray are parallel both on an object side and on an image side.

Emitted light of light source device 100b enters mirror 82b via lens 81b. Mirror 82b is disposed at an angle of 45° to an optical axis of lens 81b. Emitted light (red, blue and green) of lens 81b enters mirror 82b at an entrance angle of about 45°. Mirror 82b reflects the emitted light of mirror 82b toward lens 83b. The reflected light from mirror 82b enters reflection element 53 via lens 83b. Here, lenses 81b and 83b and the lenses in light source device 100b may constitute a second double telecentric optical system.

Hereinafter, an operation of the light source system will be described.

FIG. 9 is a schematic view to explain the operation of the light source system shown in FIG. 8.

First optical system 51 forms light source images of light source devices 100a and 100b in different regions on first image forming surface 55. First optical system 51 includes reflection element 53. The light source image of light source device 100a is an optical image in which respective light source images of red light source unit 110R, blue light source unit 110B and green light source unit 110G are superimposed on one another. Here, the light source image of red light source unit 110R is a light source image formed on the exit surface of rod integrator 6 shown in FIG. 4. The light source image of blue light source unit 110B is a light source image of a blue solid light source arranged two-dimensionally. The light source image of green light source unit 110G is a light source image of a surface light source that is a fluorescence emission region (the region of an excitation light spot) on a fluorescent substance part of fluorescent wheel 35 shown in FIG. 5.

Reflection element 53 is provided with first and second reflection surfaces 53a and 53b provided to form right angles to each other. First double telecentric optical system including lenses 81a and 83a forms a light source image of light source device 100a on first image forming surface 55 via first reflection surface 53a. Second double telecentric optical system including lenses 81b and 83b forms a light source image of light source device 100b on first image forming surface 55 via second reflection surface 53b.

First double telecentric optical system and second double telecentric optical system have the same structure, and are arranged so that exit surfaces face each other via reflection element 53. An optical axis of a first light flux from first double telecentric optical system matches an optical axis of a second light flux from second double telecentric optical system on the same axis.

Virtual image forming surface 54 indicates an image forming surface in a state where respective first and second reflection surfaces 53a and 53b of first double telecentric optical system and second double telecentric optical system are not interposed. Virtual image forming surface 54 and first image forming surface 55 are perpendicular to each other.

An angle formed by first reflection surface 53a and virtual image forming surface 54 is 45°, and an angle formed by the optical axis of the light flux from first double telecentric optical system and first reflection surface 53a is 45°. Similarly, an angle formed by second reflection surface 53b and virtual image forming surface 54 is also 45°, and an angle formed by the optical axis of the light flux from second double telecentric optical system and second reflection surface 53b is also 45°. First reflection surface 53a and second reflection surface 53b reflect the first light flux from first double telecentric optical system and the second light flux from second double telecentric optical system in the same direction.

First double telecentric optical system, second double telecentric optical system and reflection element 53 are arranged so that a synthesis surface light source has a predetermined shape (e.g., a predetermined aspect ratio). Here, the predetermined shape is a shape in which an etendue is taken into consideration and which can improve a light utilization efficiency in an optical system of and after rod integrator 140. The shape (the aspect ratio) of exit surface 57c of light guide section 57a substantially matches the shape (an aspect ratio) of the image forming surface.

Here, the etendue will be briefly described.

In general, in a projector, there is a restriction called etendue that is defined by a product of a sectional area of the light flux and a divergence angle (a solid angle determined by the light). To efficiently utilize the light from the light source as projection light, it is necessary to set the etendue on an irradiation side to be less than or equal to the etendue on an acceptance side. The etendue on the irradiation side is given by a multiplied value of an area of the light source and the divergence angle of the light that exits from the light source, and the etendue on the acceptance side is given by a multiplied value of an area of the display element and an acceptance angle (a solid angle) determined by F-number of the projection lens.

The optical axis of the first light flux from first double telecentric optical system and the optical axis of the second light flux from second double telecentric optical system are located on the same axis. When seen from a direction vertical to a surface that is perpendicular to first reflection surface 53a and second reflection surface 53b, an apex angle portion that is a joined portion of first and second reflection surfaces 53a and 53b may be disposed on an optical axis side from an outermost peripheral portion of the first and second light fluxes. In this case, vignetting is caused in the first and second light fluxes in the apex angle portion, so that it is possible to achieve improvement of the light utilization efficiency.

Second optical system 56 forms, on entrance surface 57b of light guide section 57a, an image of the synthesis surface light source comprising the light source images of each of light source devices 100a and 100b which are formed on first image forming surface 55. Second optical system 56 may include a third double telecentric lens optical system.

FIG. 10 schematically shows the light source images of light source devices 100a and 100b which are formed on first image forming surface 55. In FIG. 10, light source image 58a is the light source image of light source device 100a, and light source image 58b is the light source image of light source device 100b. Light source images 58a and 58b have a mutually linearly symmetric shape. Light source images 58a and 58b are formed at interval d. Synthesis surface light source 58 comprises light source images 58a and 58b. A ratio (H:V) of size H of synthesis surface light source 58 in a horizontal direction and size V in a vertical direction is the aspect ratio. First and second double telecentric optical systems and reflection element 53 are arranged so that this aspect ratio becomes such a predetermined aspect ratio that can improve the light utilization efficiency in the optical system of and after rod integrator 140.

According to the light source system of the present example embodiment, there is produced an effect of achieving a high luminance and improving a light utilization efficiency.

Hereinafter, a specific configuration of the light source system of the present example embodiment will be described.

In the light source system of the present example embodiment, reflection element 53 can be constituted of a V-shaped mirror or a right angle prism.

FIG. 11 schematically shows the V-shaped mirror that is an example of reflection element 53. This V-shaped mirror comprises two reflecting portions 60a and 60b provided so that mutual reflection surfaces form right angles. A reflection surface is formed on a surface of each of reflecting portions 60a and 60b which is opposite to a virtual image forming surface 54 side, and an angle formed by this reflection surface and virtual image forming surface 54 (or first image forming surface 55) is 45°.

FIG. 12 schematically shows change in light source images 58a and 58b when the V-shaped mirror is moved in a direction vertical to first image forming surface 55. In FIG. 12, solid arrow line A1 indicates an optical axis (the principal ray of the first light flux) of first double telecentric optical system, and solid arrow line A2 indicates an optical axis (the principal ray of the second light flux) of second double telecentric optical system. Reference signs Z1 and Z2 indicate a distance from an intersection point of reflecting portion 60a with optical axis A1 on reflection surface to virtual image forming surface 54, and reference signs Z1' and Z2' indicate a distance from the intersection point of reflecting portion 60a with optical axis A1 on the reflection surface to first image forming surface 55.

On the left side of FIG. 12, light source images 58a and 58b formed when Z1=Z1' are shown, and on the right side of FIG. 12, light source images 58a and 58b formed when Z2 (>Z1)=Z2' are shown. In the case where Z2 (>Z1)=Z2', the area (a spot size) of each of light source images 58a and 58b increases, and the interval between light source images 58a and 58b broadens, as compared with the case where Z1=Z1'.

When reflection element 53 is moved in the direction vertical to first image forming surface 55, the following conditions arise:

(1) The entrance angle of the first and second light fluxes into reflecting portions 60a and 60b (or first image forming surface 55) does not change.

(2) The image forming performance of light source images 58a and 58b of light source devices 100a and 100b onto first image forming surface 55 does not change.

(3) When vignetting occurs in the apex angle portion, the area of light source images 58a and 58b decreases.

(4) Width H of synthesis surface light source 58 in the horizontal direction and interval D between light source images 58a and 58b are proportional to double of the movement amount of reflection element 53 in the vertical direction.

In consideration of the above conditions, first and second double telecentric optical systems and reflection element 53 are arranged so that synthesis surface light source 58 has such a predetermined shape that can improve the light utilization efficiency in the optical system of and after rod integrator 140. Specifically, reflection element 53 is disposed so that vignetting occurs in the first and second light fluxes at apex angles of reflecting portions 60a and 60b.

FIG. 13 schematically shows synthesis surface light source 58 formed on first image forming surface 55 when reflection element 53 is disposed so that vignetting occurs in the first and second light fluxes. Thus, reflection element 53 is disposed so that vignetting occurs in the first and second light fluxes, so that interval D between light source images 58a and 58b can decrease as much as possible. Thus, synthesis surface light source 58 is formed in the predetermined shape and interval D between light source images 58a and 58b is decreased, so that deterioration of the light utilization efficiency due to the restriction of the etendue can be minimized. As a result, high luminance can be achieved.

Hereinafter, description will be specifically made as to the relation between vignetting and the etendue in a DMD that is an example of reflection element 53.

When the deflection angle of a micromirror of the DMD is θ, F-value (F-number) of a projection lens is given by Equation 1 as follows:

$$F_{no}=1/(2\times\sin\theta) \quad \text{(Equation 1)}$$

For example, when the micromirror operates at a deflection angle of ±12°, $F_{no}$=2.40486 (nearly equal to F/2.4) results from Equation 1 described above. When $F_{no}$ changes, brightness changes at a square of a ratio of the change. In an existing 1.38 type size DMD, F/2.5 (nearly equal to 11.5° or less). Consequently, hereinafter, description will be made in an example at F/2.5.

The etendue is given by Equation 2 as follows:

$$E=\pi\times A\times\sin^2\theta=\pi\times A\div 4F_{no}^2 \quad \text{(Equation 2)},$$

in which A is an area of the DMD (an area of the image forming surface), and θ is the deflection angle of the micromirror. A size of the 1.38 type size DMD in a horizontal direction (H) is 30.96 mm, and a size in a vertical direction (V) is 16.33 mm (A=505.66 mm²). In Equation 2 described above, when F/2.5, E=63.54. Therefore, a multiplied value of the area of the surface light source formed on first image forming surface 55 and a divergence angle (a solid angle) of light emitted from this surface light source is brought to be close to 63.54, so that the light from the light source can be efficiently utilized.

In the present example embodiment, to minimize the deterioration of the light utilization efficiency, vignetting is caused as shown in FIG. 13. Consequently, sizes H and V of synthesis surface light source 58 can be set to 14.0 mm and 7.6 mm, respectively, and E=67.5 can be obtained (provided that light of 3% is cut for vignetting). This etendue value of 67.5 is close to the above etendue value of 63.54.

Note that when reflection element 53 is disposed so that vignetting does not occur, E=94.5 is obtained, and this value noticeably deviates from the above etendue value of 63.54.

An angle of the DMD on the image forming surface when E=67.5 is 11.9°. On the other hand, an angle of the DMD on the image forming surface when E=94.5 is 14.1°. When these angles are converted into F-numbers to obtain a ratio of brightness, the brightness increases as much as about 29% in the case where E=67.5.

As described above, reflection element 53 causes vignetting, so that deterioration of the light utilization efficiency due to the restriction of the etendue can be minimized, and a high luminance can be achieved.

Next, another example of reflection element 53 will be described.

FIG. 14 schematically shows a right angle prism that is another example of reflection element 53. Right angle prism 61 has reflection surfaces 61a and 61b that form right angles to each other. An angle formed by reflection surface 61a and virtual image forming surface 54 (or first image forming surface 55) is 45°. An angle formed by reflection surface 61b and virtual image forming surface 54 (or first image forming surface 55) is also 45°.

FIG. 15 schematically shows change in light source images 58a and 58b when right angle prism 61 is moved in the direction vertical to first image forming surface 55. In FIG. 15, solid arrow line A1 indicates the optical axis (the principal ray of the first light flux) of first double telecentric optical system 52a, and solid arrow line A2 indicates the optical axis (the principal ray of the second light flux) of second double telecentric optical system 52b. Reference signs Z1 and Z2 indicate a distance from an intersection point with optical axis A1 on reflection surface 61a to virtual image forming surface 54, and reference signs Z1' and Z2' indicate a distance from the intersection point with optical axis A1 on reflection surface 61a to first image forming surface 55.

On the left side of FIG. 15, light source images 58a and 58b formed when Z1=Z1' are shown, and on the right side of FIG. 15, light source images 58a and 58b formed when Z2 (>Z1)=Z2' are shown. Similarly to the V-shaped mirror shown in FIG. 12, in the case where Z2 (>Z1)=Z2', the area (the spot size) of each of light source images 58a and 58b increases, and the interval between light source images 58a and 58b broadens, as compared with the case where Z1=Z1'.

First and second double telecentric optical systems and right angle prism 61 are arranged so that synthesis surface light source 58 has such a predetermined shape that can improve the light utilization efficiency in the optical system of and after rod integrator 140. Specifically, right angle prism 61 is disposed so that vignetting occurs in the first and second light fluxes at apex angles of reflection surfaces 61a and 61b.

Also in a case where right angle prism 61 described above is used, operations and effects are produced in the same manner as in a case where the V-shaped mirror is used.

Furthermore, such effects as follows are produced in the case where right angle prism 61 is used as compared with the case where the V-shaped mirror is used.

FIG. 16A schematically shows a positional relation between apex angle portions of right angle prism 61 and the V-shaped mirror when synthesis surface light source 58 is formed in the predetermined shape (size) in the state of the occurrence of vignetting. FIG. 16B schematically shows light source images 58a and 58b formed on first image forming surface 55 in a state shown in FIG. 16A.

The apex angle portion of right angle prism 61 is a right angle surface, while the apex angle portion of the V-shaped mirror (a joined portion of reflecting portions 60a and 60b) does not become the right angle surface. Consequently, as shown in FIG. 16A, the apex angle portion of right angle prism 61 is located on first image forming surface 55 side as much as height d1 from the joined portion of reflecting portions 60a and 60b of the V-shaped mirror in the direction vertical to first image forming surface 55. As a result, as shown in FIG. 16B, light source images 58a and 58b (broken lines) in the case where right angle prism 61 is used become larger than light source images 58a and 58b (solid lines) in the case where the V-shaped mirror is used. In the case where the right angle prism 61 is used and in the case where the V-shaped mirror is used, the size of synthesis surface light source 58 does not change, but light source images 58a and 58b (the solid lines) enlarge. Consequently, light can be more efficiently accepted, and light utilization efficiency can further improve.

Next, a configuration of a projection type display apparatus provided with the above described light source system will be described.

FIG. 17 is a schematic view showing the configuration of the projection type display apparatus provided with the light source system shown in FIG. 8.

Referring to FIG. 17, the projection type display apparatus includes light source devices 100a and 100b, first optical system 51, second optical system 56, rod integrator 140, illumination optical system 150, prism section 160, DMD 161 and projection lens 170. Illumination optical system 150, prism section 160, DMD 161 and projection lens 170 are described in the first example embodiment.

Light (red, blue and green) emitted from an exit surface of rod integrator 140 enters prism section 160 via illumination optical system 150. In prism section 160, illumination light from illumination optical system 150 is separated into red light, blue light and green light. First DMD 161 is irradiated with the red light. Second DMD 161 is irradiated with the blue light. Third DMD 161 is irradiated with the green light.

First DMD 161 modulates the red light to form a red image. Second DMD 161 modulates the blue light to form a blue image. Third DMD 161 modulates the green light to form a green image. Red image light from first DMD 161, blue image light from second DMD 161 and green image light from third DMD 161 enter projection lens 170 via prism section 160. Projection lens 170 enlarges and projects the red image light, the blue image light and the green image light on an unshown projection surface.

According to the above described projection type display apparatus, high luminance can be achieved by using two light source devices 100a and 100b.

Furthermore, each of the two light source devices 100a and 100b has a two-floor structure, and hence, miniaturization of the projection type display apparatus and reduction of an installation area can be achieved, as compared with a case where two light source devices of a one-floor structure are used.

Third Example Embodiment

FIG. 18 is a schematic view showing a configuration of a light source device that is a third example embodiment of the present invention.

As shown in FIG. 18, the light source device includes light source accommodating section 40, emission window 41, first light synthesizer 42 and second light synthesizer 43. Light source accommodating section 40 is provided with a story structure comprising first accommodation story 40a and second accommodation story 40b. In first accommodation story 40a, red light source 44R that emits red laser light and blue light source 44B that emits blue laser light are accommodated. In second accommodation story 40b, green light source 44G that emits green fluorescence is accommodated. Emission window 41 is provided on a second accommodation story 40b side.

First light synthesizer 42 synthesizes an optical path of the red laser light emitted from red light source 44R and an optical path of the blue laser light emitted from blue light source 44B into one optical path. First light synthesizer 42 emits first synthesized light into which the red laser light and the blue laser light are synthesized.

Second light synthesizer 43 synthesizes an optical path of the green fluorescence emitted from green light source 44G and an optical path of the first synthesized light emitted from first light synthesizer 42 into one optical path. Second light synthesizer 43 emits, toward emission window 41, second synthesized light into which the green fluorescence and the first synthesized light are synthesized.

According to the light source device of the light source system of the present example embodiment, the following effects are produced.

In first accommodation story 40a, red light source 44R and blue light source 44B are accommodated, and in second accommodation story 40b, green light source 44G is accommodated. According to such a story structure (a two-floor structure), the depth and the width of the housing can be decreased, and the installation area can be decreased, as compared with a one-floor structure in which all light source units are arranged on the same plane.

Furthermore, first light synthesizer 42 synthesizes the red laser light and the blue laser light. In this case, optical members (the mirror, the dichroic mirror and others) that constitute first light synthesizer 42 are arranged on the optical path of laser light having a divergence angle that is smaller than that of the green fluorescence. Consequently, the sizes of optical members can be decreased.

Note that in an example shown in FIG. 18, it is thought that first accommodation story 40a is a first story and that second accommodation story 40b is a second story, but the present invention is not limited to this example. First accommodation story 40a may be the second story, and second accommodation story 40b may be the first story.

Furthermore, a diffusion plate may be provided on an optical path of the second synthesized light.

Additionally, on the optical path of the second synthesized light, there may be provided a light flux diameter adjusting lens to adjust a light flux diameter of the second synthesized light to a light flux diameter of the green fluorescence.

Next, a projection type display apparatus provided with the light source device of the present example embodiment will be described.

The projection type display apparatus includes the light source device of the present example embodiment, an image forming section that modulates output light of the light source device to form an image, and a projection lens that projects the image formed by the image forming section.

The above projection type display apparatus may further include an optical system that guides the output light of the light source device to the image forming section. In this case, the image forming section may include first to third display elements, and the optical system may comprise a rod integrator that comprises a prismatic columnar rod portion and in which light that enters one surface propagates through a rod to exit from the other surface; a relay optical system via which the output light of the light source device enters the one surface of the rod integrator; and a prism section that reflects light emitted from the other surface of the rod integrator toward the image forming section, and that emits image light from the image forming section toward the projection lens. The bottom surface of a housing that accommodates the light source device, the image forming section, the projection lens and the optical system may be defined as a reference surface, and the height from the reference surface of the light source device may be lower than a height from the reference surface of the prism section.

Another projection type display apparatus is provided with two light source devices of the present example embodiment. Specifically, the projection type display apparatus includes first and second light source devices; a light synthesizer that synthesizes an optical path of output light of the first light source device and an optical path of output light of the second light source device into one optical path, and that emits illumination light into which the output light of the first light source device and the output light of the second light source device are synthesized; an image forming section that modulates the illumination light to form an image; and a projection lens that projects the image formed by the image forming section. Each of the first and second light source devices includes the configuration shown in FIG. 18.

EXPLANATION OF REFERENCE NUMBERS 40 light source accommodating section
40R red light source
40B blue light source
40G green light source 41 emission window
42 first light synthesizer
43 second light synthesizer

The invention claimed is:

1. A light source device comprising:
a light source accommodating section provided with a story structure comprising a first accommodation story and a second accommodation story;
a red light source that emits red laser light, said red light source being accommodated in said first accommodation story;
a blue light source that emits blue laser light, said blue light source being accommodated in said first accommodation story;
a green light source that emits green fluorescence, said green light source being accommodated in said second accommodation story;
a first light synthesizer that synthesizes an optical path of said red laser light emitted from said red source and an optical path of said blue laser light emitted from said blue light source into one optical path, and that emits first synthesized light into which said red laser light and said blue laser light are synthesized;
a second light synthesizer that synthesizes an optical path of said green fluorescence emitted from said green light source and an optical Path of, said first synthesized light emitted from said first light synthesizer into one optical path, and that emits second synthesized light into which said green fluorescence and said first synthesized light are synthesized; and
an emission window provided on a side of said second accommodation story, wherein said second light synthesizer emits said second synthesized light toward said emission window.

2. The light source device according to claim 1, wherein said second accommodation story is provided on said first accommodation story.

3. The light source device according to claim 1, further comprising a diffusion plate on an optical path of said second synthesized light.

4. A projection type display apparatus comprising:
the light source device according to claim 1,
an image forming section that modulates output light of said light source device to form an image, and
a projection lens that projects the image formed by the image forming section.

5. The projection type display apparatus according to claim 4, further comprising an optical system that guides output light of said light source device to said image forming section,
wherein the image forming section comprises first to third display elements, and
the optical system comprises a rod integrator that comprises a prismatic columnar rod portion and in which light that enters one surface propagates through a rod to exit from the other surface,
a relay optical system via which the output light of said light source device enters said one surface of said rod integrator, and
a prism section that reflects light emitted from said other surface of said rod integrator toward said image forming section, and that emits image light from said image forming section toward said projection lens, and
a bottom surface of a housing that accommodates said light source device, said image forming section, said projection lens and said optical system is defined as a reference surface, and a height from said reference surface to a top of said light source device is lower than a height from said reference surface to a top of said prism section.

6. A light source device comprising:
a light source accommodating section provided with a story structure comprising a first accommodation story and a second accommodation story;
a red light that emits red laser light, said red light source being accommodated in said first accommodation story;
a blue light source that emits blue laser light, said blue light source being accommodated in said first accommodation story;
a green light source that emits green fluorescence, said green light source being accommodated in said second accommodation story;
a first light synthesizer that synthesizes an optical path of said red laser light emitted from said red light source and an optical path of said blue laser light emitted from said blue light source into one optical path, and that emits first synthesized light into which said red laser light and said blue laser light are synthesized;
a second light synthesizer that synthesizes an optical path of said green fluorescence emitted from said green light source and an optical path of said first synthesized light emitted from said first light synthesizer into one optical path, and that emits second synthesized light into which said green fluorescence and said first synthesized light are synthesized; and
a light flux diameter adjusting lens provided on the optical path of said first synthesized light to adjust a light flux diameter of said first synthesized light to a light flux diameter of said green fluorescence.

7. The light source device according to claim 6, wherein said second accommodation story is provided on said first accommodation story.

8. The light source device according to claim 6, further comprising a diffusion plate on an optical path of said second synthesized light.

9. A projection type display apparatus comprising:
the light source device according to claim 6,
an image forming section that modulates output light of said light source device to form an image, and
a projection lens that projects the image formed by the image forming section.

10. The projection type display apparatus according to claim 9, further comprising an optical system that guides output light of said light source device to said image forming section,
wherein the image forming section comprises first to third display elements, and
the optical system comprises a rod integrator that comprises a prismatic columnar rod portion and in which light that enters one surface propagates through a rod to exit from the other surface,
a relay optical system via which the output light of said light source device enters said one surface of said rod integrator, and
a prism section that reflects light emitted from said other surface of said rod integrator toward said image forming section, and that emits image light from said image forming section toward said projection lens, and
a bottom surface of a housing that accommodates said light source device, said image forming section, said projection lens and said optical system is defined as a reference surface, and a height from said reference surface to a top of said light source device is lower than a height from said reference surface to a top of said prism section.

11. A projection type display apparatus, comprising:

first and second light source devices, a light synthesizer that synthesizes an optical path of output light of said first light source device and an optical path of output light of said second light source device into one optical path, and that emits illumination light into which the output light of said first light source device and the output light of said second light source device are synthesized, an image forming section that modulates said illumination light to form an image, and a projection lens that projects the image formed by said image forming section, wherein each of said first and second light source devices comprises:

a light source accommodating section provided with a story structure comprising a first accommodation story and a second accommodation story;

a red light source that emits red laser light, said red light source being accommodated in said first accommodation story;

a blue light source that emits blue laser light, said blue light source being accommodated in said first accommodation story; and a green light source that emits green fluorescence, said green light source being accommodated in said second accommodation story;

a first light synthesizer that synthesizes an optical path of said red laser light emitted from said red light source and an optical path of said blue laser light emitted from said blue source into one optical path, and that emits first synthesized light into which said red laser light and said blue laser light are synthesized;

a second light synthesizer that synthesizes an optical path of said green fluorescence emitted from said green source and an optical path of said first synthesized light emitted from said first light synthesizer into one optical path, and that emits second synthesized light into which said green fluorescence and said first synthesized light are synthesized; and an emission window provided on a side of said second accommodation story, wherein said second light synthesizer emits said second synthesized light toward said emission window.

12. The light source device according to claim 11, wherein said second accommodation story is provided on said first accommodation story.

13. The light source device according to claim 11, further comprising a diffusion plate on an optical path of said second synthesized light.

\* \* \* \* \*